United States Patent Office 2,921,825
Patented Jan. 19, 1960

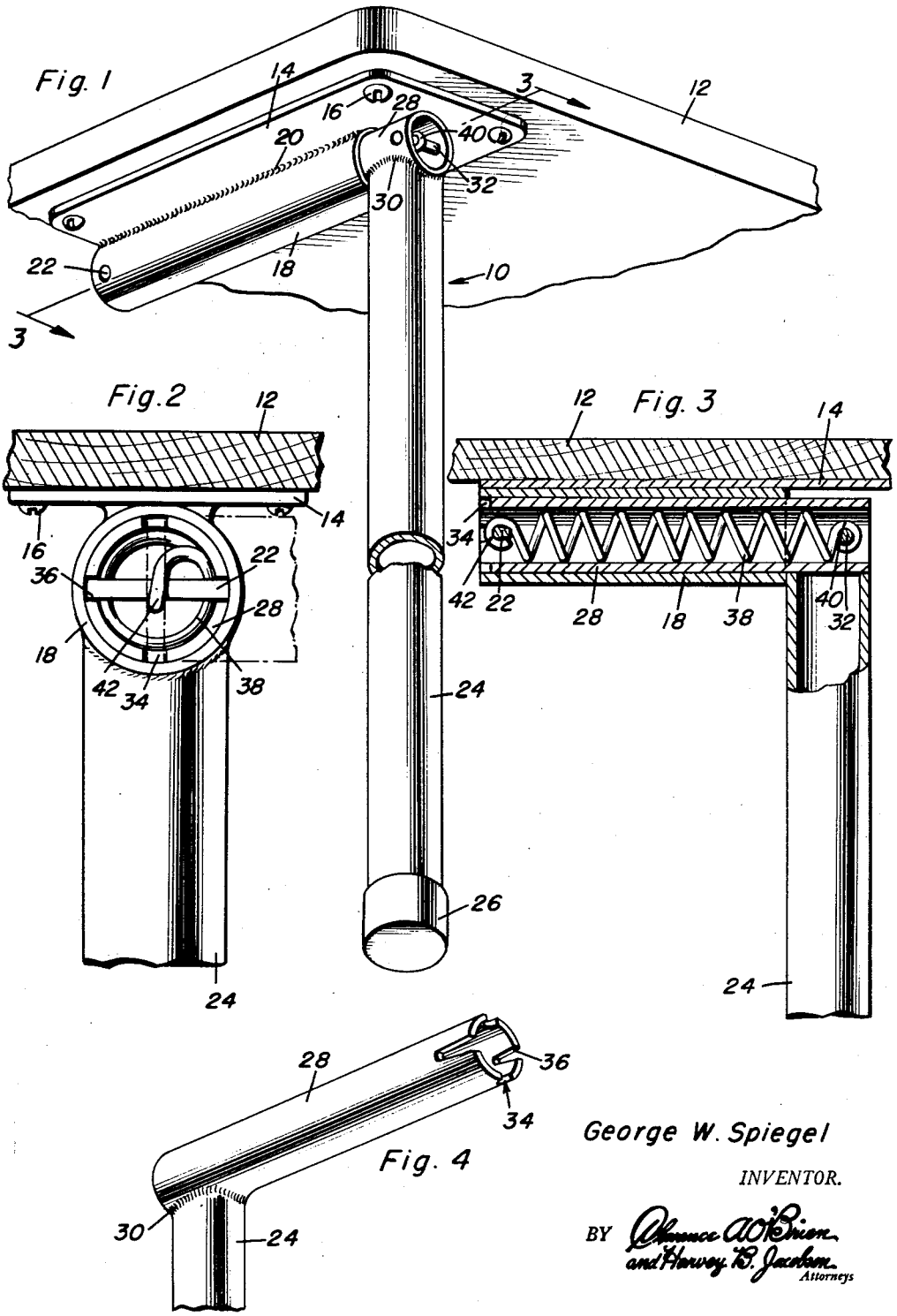
Jan. 19, 1960  G. W. SPIEGEL  2,921,825
ADJUSTABLE LEG
Filed April 12, 1954
George W. Spiegel
INVENTOR.

2,921,825
ADJUSTABLE LEG
George W. Spiegel, Clintonville, Wis.
Application April 12, 1954, Serial No. 422,301
4 Claims. (Cl. 311—99)

This invention relates to an adjustable leg, and more specifically provides a leg for supporting an object in spaced relation to a supporting surface which may be folded to a collapsed or retracted position.

An object of this invention is to provide an adjustable leg which may be used for tables of various types, chairs, ironingboards, and for various other uses which require a supporting leg or legs which may be folded to a collapsed position wherein the supporting object may be stored or transported in a compact condition.

A further object of this invention is to provide an adjustable leg for supporting an object wherein resilient means retains interengaging pins and notches in engagement for locking the leg in adjusted position.

Still another important object of this invention is to provide an adjustable leg having complementary tapers in an interengaging notch and pin for locking the leg in rigid position and preventing looseness therein.

A still further important object of this invention is to provide an adjustable leg which is simple in construction, easy to attach, easy to operate, well adapted for its purposes and relatively inexpensive to manufacture.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the adjustable leg of the present invention mounted on the under surface of a table;

Figure 2 is an end view of the construction of Figure 1 looking at the outer end of the leg;

Figure 3 is an elongated, longitudinal section taken substantially along section line 3—3 of Figure 1 showing the details of construction of the tubular sleeve and the telescopic portion of the leg; and Figure 4 is a perspective view showing the upper angulated end portion of the adjustable leg of the present invention.

Referring now specifically to the drawings, it will be seen that the numeral 10 generally designates the adjustable leg of the present invention for attachment to the under surface of a table 12 or other objects desirous of being supported.

The adjustable leg 10 includes a bracket in the form of a rectangular plate 14 secured to the under surface of a table 12 by suitable screw fasteners 16 and an elongated tubular sleeve 18 is positioned on the plate 14 by suitable welding 20 or other fastening means. It will be seen that the tubular sleeve 18 is positioned horizontally and a transverse pin 22 is extended across the inner end of the tubular sleeve 18. The pin 22 is provided with a tapered cross section wherein the upper and lower walls converge toward the outer end of the tubular sleeve 18.

A tubular leg 24 having a suitable cap 26 on its lower end is provided with an angularly extending tubular upper end 28 which is rigidly secured to the leg 24 by suitable welding, or the like, 30. The outer end of the tubular upper end 28 is flush with the outer side wall of the leg 24 thereby providing a smooth and attractive appearing leg. A transverse circular pin 32 or a circular disc is provided in the outer end of the tubular upper end 28 and the inner end of the tubular member 28 is provided with a pair of oppositely disposed semicircular notches 34 and a pair of oppositely disposed notches 36 having inwardly converging side walls thereby forming tapered notches 36 for reception of the tapered pin 22. A tension coil spring 38 is provided with one hooked end 40 engaging the transverse pin 32 in the outer end of the tubular member 28 and a second hooked end member 42 engaging the transverse pin 22 in the inner end of the tubular sleeve 18 thereby urging the tubular sleeve 28 into the tubular sleeve 18. It will be seen that the transverse pins 32 and 22 are parallel to each other and the pair of notches 34 are positioned at right angles to the pair of notches 36 wherein the leg 24 may be adjusted about an axis and locked in position at 90 degree angles. The notches 36 and the notches 34 are so disposed so that the tapered pin 22 is in engagement with the tapered notches 36 when the tubular leg 24 is in supporting position which is normally in a vertical position. Due to the complementary taper on the transverse pin and the notches 36, it will be seen that the pin 22 closely engages the sides of the notches 36 thereby preventing any angular motion of the leg 24 when in its supporting position. The notches 34 are generally semicircular and of less depth than the notches 36 thereby providing a temporary lock for retaining the legs 24 in collapsed position. The legs 24 may be moved from their temporary position by merely grasping the leg and forcing the leg 24 downwardly thereby overcoming the tension of the spring 28 and permitting the transverse pin 22 to ride up out of the notches 34. However, it will be seen that the depths of the notches 36 will not permit this overriding action when the leg 24 is in supporting position. It will be understood that the device may be constructed of any suitable material and decorated in such a manner to be compatible with the object that is supported by the adjustable leg 10 of the present invention.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. Table leg construction for attachment to a table top for supporting the top in a generally horizontal plane comprising a bracket adapted to be secured to the undersurface of the top, a cylindrical sleeve on said bracket having a longitudinal axis substantially parallel to the plane of the top, an elongated leg, a laterally extending cylindrical end portion on said leg rotatably journalled in said sleeve, said sleeve and end portion being substantially coextensive with the end portion engaging substantially the entire inner surface of the sleeve, a transverse pin in one end of the sleeve, the free end of said end portion having circumferentially spaced pairs of notches for engagement with the transverse pin, resilient means interconnecting the sleeve and end portion for urging the end portion inwardly of the sleeve and engaging the free end of the end portion with the transverse pin, one pair of notches being shallow and semi-circular in shape and the other of said pair of notches being deep and formed with inwardly converging edges, said transverse pin being wedge shaped for engagement in said deep pair of notches for rigidly holding the leg in perpendicular relation to the top, said wedge-shaped pin frictionally engaging the edges of the shallow notches for retaining the leg alongside the undersurface of the top whereby the leg may be moved from a horizontal to a vertical position by instantaneous rapid upward movement of the top.

2. A leg structure for use in supporting a table comprising an elongated horizontally disposed tubular sleeve having a transverse pin in one end thereof, a leg carried by said sleeve for swinging movement in a vertical plane, said leg including an elongated horizontally extending upper end concentrically disposed within said sleeve for pivotal movement thereof about the longitudinal axis of the sleeve, the free end of upper end of the leg having two pairs of diametrically opposed notches disposed in angular relation for receiving said pin, resilient means interconnecting the pin and the upper end of the leg for urging the notches into engagement with the transverse pin.

3. The combination of claim 2 wherein said resilient means includes a coil spring located within the upper end of the leg, one of said pair of notches being shallow and semi-circular in shape for frictionally holding the legs in horizontal position and permitting downward swinging movement of the leg upon instantaneous upward and rapid movement of the table, the other pair of notches being deep for rigidly retaining the leg in vertical position.

4. The structure as defined in claim 3 wherein said transverse pin and pair of deep notches are tapered thereby providing a rigid connection between the upper end of the leg and sleeve.

References Cited in the file of this patent

UNITED STATES PATENTS

| | | |
|---|---|---|
| 729,432 | Sidway | May 26, 1903 |
| 919,981 | Unger | Apr. 27, 1909 |
| 1,522,830 | Nichols et al. | Jan. 13, 1925 |
| 1,753,506 | Florine | Apr. 8, 1930 |
| 1,809,564 | O'Connor et al. | June 9, 1931 |
| 1,820,592 | Bauer | Aug. 25, 1931 |
| 1,938,507 | Wilson | Dec. 5, 1933 |
| 2,425,162 | Overby | Aug. 5, 1947 |
| 2,487,401 | Turner | Nov. 8, 1949 |

FOREIGN PATENTS

| | | |
|---|---|---|
| 5,157 | Norway | Aug. 26, 1896 |
| 264,551 | Switzerland | Oct. 31, 1949 |